US011048948B2

(12) United States Patent
Chan et al.

(10) Patent No.: US 11,048,948 B2
(45) Date of Patent: Jun. 29, 2021

(54) SYSTEM AND METHOD FOR COUNTING OBJECTS

(71) Applicant: City University of Hong Kong, Kowloon (HK)

(72) Inventors: Antoni Bert Chan, Kowloon (HK); Qi Zhang, Kowloon (HK)

(73) Assignee: City University of Hong Kong, Kowloon (HK)

( * ) Notice: Subject to any disclaimer, the term of this patent is extended or adjusted under 35 U.S.C. 154(b) by 134 days.

(21) Appl. No.: 16/435,837

(22) Filed: Jun. 10, 2019

(65) Prior Publication Data
US 2020/0387718 A1    Dec. 10, 2020

(51) Int. Cl.
| | |
|---|---|
| *G06K 9/00* | (2006.01) |
| *H04N 13/282* | (2018.01) |
| *G06N 3/08* | (2006.01) |
| *G06K 9/62* | (2006.01) |
| *G06T 17/05* | (2011.01) |

(52) U.S. Cl.
CPC ........ *G06K 9/00778* (2013.01); *G06K 9/6232* (2013.01); *G06N 3/08* (2013.01); *G06T 17/05* (2013.01); *H04N 13/282* (2018.05)

(58) Field of Classification Search
CPC ................................................. G06K 9/00778
See application file for complete search history.

(56) References Cited

U.S. PATENT DOCUMENTS

| | | | | |
|---|---|---|---|---|
| 8,660,351 | B2* | 2/2014 | Tang | H04N 1/3873 382/173 |
| 9,251,410 | B1* | 2/2016 | Lin | G06K 9/00295 |
| 10,354,144 | B2* | 7/2019 | Bataller | G06K 9/00295 |
| 10,453,197 | B1* | 10/2019 | Cholakkal | G06K 9/4628 |
| 10,565,729 | B2* | 2/2020 | Vajda | G06K 9/6271 |
| 10,810,723 | B2* | 10/2020 | Onoro-Rubio | G06F 17/11 |
| 2007/0058836 | A1* | 3/2007 | Boregowda | G06K 9/00771 382/103 |
| 2008/0106599 | A1* | 5/2008 | Liu | G06K 9/3241 348/143 |

(Continued)

FOREIGN PATENT DOCUMENTS

| | | |
|---|---|---|
| CN | 102819764 | 12/2012 |
| CN | 106326937 A * | 1/2017 |

(Continued)

OTHER PUBLICATIONS

People counting via multiple views using a fast information fusion approach, Mikael A. Mousse et al., Springer, 10.1007/s11042-016-3352-z, Feb. 22, 2016, pp. 6801-6819 (Year: 2016).*

(Continued)

*Primary Examiner* — Jayesh A Patel
(74) *Attorney, Agent, or Firm* — Renner Kenner Greive Bobak Taylor & Weber

(57) ABSTRACT

A system and a method for counting objects includes the steps of: obtaining a plurality of images representing the objects to be counted in a target area; generating a map for each of the plurality of images representing an identification of each of the corresponding objects; and fusing the plurality of maps being generated to obtain a scene-level density map representing a count of the objects in the target area.

27 Claims, 10 Drawing Sheets

(56) References Cited

U.S. PATENT DOCUMENTS

| | | | |
|---|---|---|---|
| 2008/0118106 A1* | 5/2008 | Kilambi | G06K 9/00362 |
| | | | 382/103 |
| 2008/0212099 A1* | 9/2008 | Chen | G08B 13/19608 |
| | | | 356/408 |
| 2013/0136307 A1* | 5/2013 | Yu | G06T 7/12 |
| | | | 382/103 |
| 2013/0155229 A1* | 6/2013 | Thornton | H04N 7/18 |
| | | | 348/143 |
| 2014/0072170 A1* | 3/2014 | Zhang | G06K 9/00624 |
| | | | 382/103 |
| 2014/0139633 A1* | 5/2014 | Wang | G06K 9/00778 |
| | | | 348/46 |
| 2014/0270358 A1* | 9/2014 | Zhu | G06K 9/4642 |
| | | | 382/103 |
| 2014/0348382 A1* | 11/2014 | Sasatani | G06T 7/73 |
| | | | 382/103 |
| 2016/0110613 A1* | 4/2016 | Ghanem | G06T 7/215 |
| | | | 382/103 |
| 2016/0132755 A1* | 5/2016 | Ikeda | G06K 9/00778 |
| | | | 382/159 |
| 2016/0321507 A1* | 11/2016 | Yang | G06T 7/246 |
| 2018/0181803 A1* | 6/2018 | Zhang | G06T 7/136 |
| 2019/0057507 A1* | 2/2019 | El-Khamy | G06T 11/60 |
| 2019/0095720 A1* | 3/2019 | Ju | G06K 9/6215 |
| 2019/0147584 A1* | 5/2019 | Onoro-Rubio | G06F 17/11 |
| | | | 382/100 |
| 2019/0206085 A1* | 7/2019 | Jiang | G06N 3/082 |
| 2020/0074186 A1* | 3/2020 | Cao | G06N 3/08 |
| 2020/0118423 A1* | 4/2020 | Moura | G08G 1/0116 |
| 2020/0193628 A1* | 6/2020 | Chakraborty | G06K 9/00805 |

FOREIGN PATENT DOCUMENTS

| | | | | |
|---|---|---|---|---|
| CN | 107330364 A | * | 11/2017 | |
| CN | 107967451 A | * | 4/2018 | |
| CN | 109753898 A | * | 5/2019 | |
| WO | WO-2019084854 A1 | * | 5/2019 | G06T 7/136 |

OTHER PUBLICATIONS

Low-Rank and Sparse Based Deep-Fusion Convolutional Neural Network for Crowd Counting, Siqi Tang et al., Hindawi, 10.1155/2017/5046727, Sep. 25, 2017, pp. 1-11 (Year: 2017).*

A. B. Chan, et al, "Privacy Preserving Crowd Monitoring: Counting People without People Models or Tracking", Computer Vision and Pattern Recognition, pp. 1-7, 2008.

P. Sabzmeydani, et al, "Detecting Pedestrians by Learning Shapelet Features", IEEE Conference on Computer Vision and Pattern Recognition, pp. 1-8. IEEE, 2007.

V. Lempitsky, et al. "Learning to Count Objects in Images", Advances in Neural Information Processing Systems, pp. 1324-1332, 2010.

C. Zhang, et al, "Cross-Scene Crowd Counting via Deep Convolutional Neural Networks", IEEE Conference on Computer Vision and Pattern Recognition, pp. 833-841, 2015.

Y. Zhang, et al, "Single Image Crowd Counting via Multi-Column Convolutional Neural Network". IEEE conference on computer vision and pattern recognition, pp. 589-597, 2016.

X. Cao, et al, "Scale Aggregation Network for Accurate and Efficient Crowd Counting". European Conference on Computer Vision (ECCV), pp. 734-750, 2018.

D. Ryan, et al, "Scene Invariant Multi Camera Crowd Counting". Pattern Recognition Letters, 44(8):98-112, 2014.

N. Tang, et al, "Cross-camera knowledge transfer for multi-view people counting", IEEE Transactions on Image Processing, 24(1):80-93, 2014.

J. Li, et al, "People Counting across Multiple Cameras for Intelligent Video Surveillance", IEEE Ninth International Conference on Advanced Video and Signal Based Surveillance (AVSS), pp. 178-183. IEEE, 2012.

H. Ma, et al, "A Reliable People Counting System via Multiple Cameras". ACM Transactions on Intelligent Systems and Technology (TIST), 3(2):31, 2012.

L. Maddalena, et al, "People Counting by Learning Their Appearance in a Multi-View Camera Environment", Pattern Recognition Letters, 36:125-134, 2014.

* cited by examiner

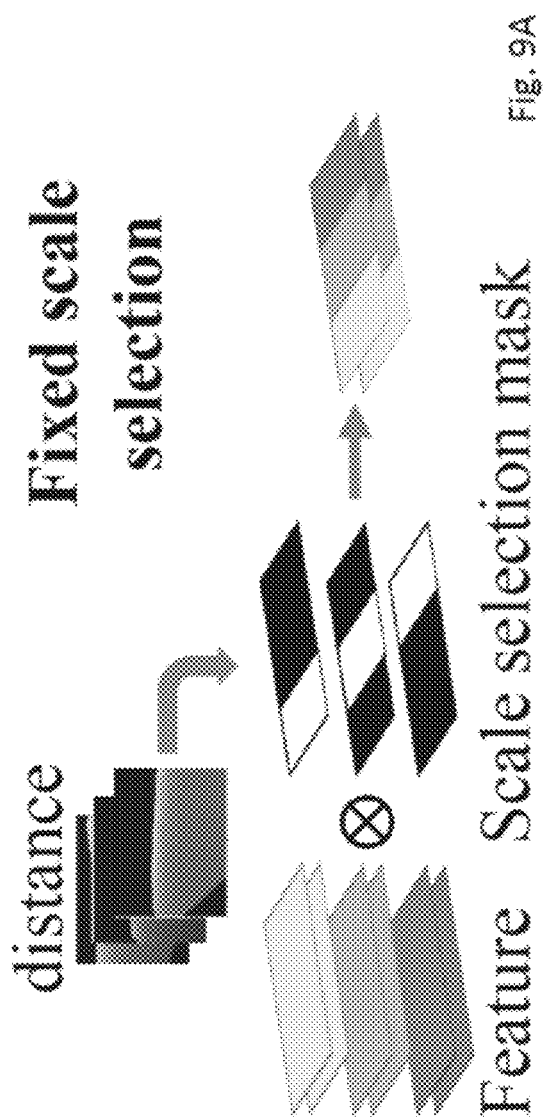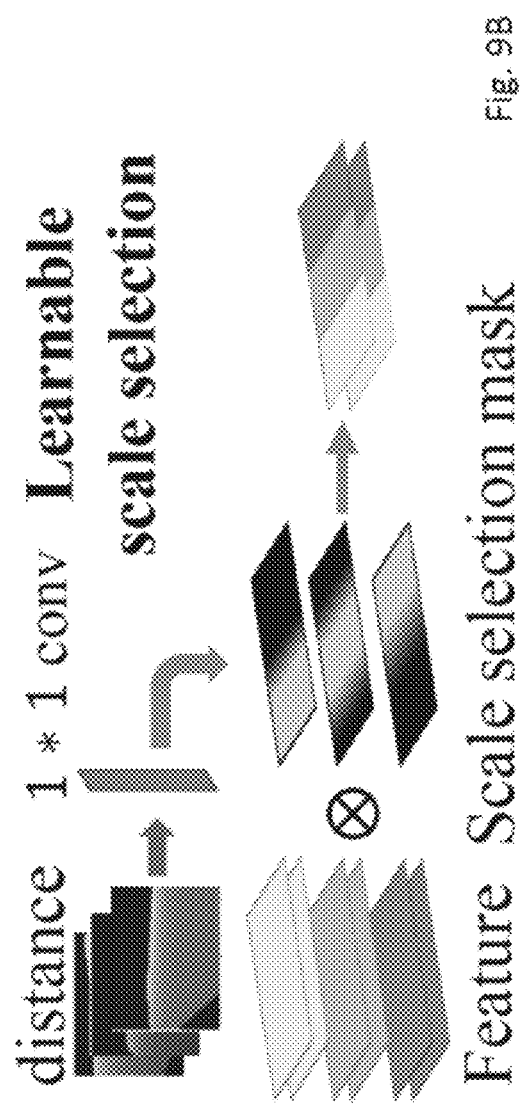

SYSTEM AND METHOD FOR COUNTING OBJECTS

TECHNICAL FIELD

The present invention relates to a system and method for counting objects, and particularly, although not exclusively, to a system and method for counting number of people in an area.

BACKGROUND

Crowd counting may be useful in many applications. For example, it may be necessary to count a number of people entering and leaving certain premises to estimate a ventilation need in an indoor area. In another example, it may be useful to estimate occupancy in a retail store for marketing purpose.

Different method may be used to estimate or even accurately determining the number of people in an area. A simple way may be deploying controllable gates at entrances and exits of such area, such that individual entering and leaving the area will be recorded by the gate. However, this method may not be suitable for applications with large counts or very crowded places.

SUMMARY OF THE INVENTION

In accordance with a first aspect of the present invention, there is provided a method of counting objects, comprising the steps of: obtaining a plurality of images representing the objects to be counted in a target area; generating a map for each of the plurality of images representing an identification of each of the corresponding object; and fusing the plurality of map being generated to obtain a scene-level density map representing a count of the objects in the target area.

In an embodiment of the first aspect, the plurality of images are obtained by a plurality of cameras each arranged to capture a scene representing at least a portion of the target area.

In an embodiment of the first aspect, the identification of the objects is based on identifying at least one feature of the object.

In an embodiment of the first aspect, the at least one feature include a head of the object.

In an embodiment of the first aspect, the identification of the objects is further based on head annotations on an average-height plane at a predetermined height level in a three-dimensional space.

In an embodiment of the first aspect, the step of generating the map for each of the plurality of images further comprises the step of generating a three-dimensional ground-plane representation representing the identification of the objects in a two-dimensional image space covered by each of the plurality of images.

In an embodiment of the first aspect, the step of generating the map for each of the plurality of images comprises the step of generating a plurality of view-level density maps representing a count of the objects in each of the scenes representing respective portions of the target area.

In an embodiment of the first aspect, a plurality of three-dimensional ground-plane representations are generated based on each of the plurality of view-level density maps generated.

In an embodiment of the first aspect, the step of fusing the plurality of map comprises the step of concatenating the plurality three-dimensional ground-plane representations to obtain the scene-level density map.

In an embodiment of the first aspect, the method further comprises the step of normalizing the plurality three-dimensional ground-plane representations.

In an embodiment of the first aspect, the normalization is based on a normalization weight at each of the ground-plane position (x, y):

$$w_{xy} = \frac{\sum_{ij} D_{x_0,y_0}(i,j)}{\sum_{mn} \mathcal{P}(D_{x_0,y_0}(m,n))}$$

wherein:
$D_{x_0, y_0}$ denotes an image-space density map containing only one Gaussian kernel centred at $(x_0, y_0)$;
P is a projection operation from image space to ground plane; and
(i, j) and (m, n) are respectively image coordinates and ground plane coordinates.

In an embodiment of the first aspect, the step of generating the map for each of the plurality of images comprises the step of generating a plurality of feature maps representing the identified features in each of the scenes representing respective portions of the target area.

In an embodiment of the first aspect, the plurality of feature maps are generated based on an extraction of features from each of the plurality of images.

In an embodiment of the first aspect, a plurality of three-dimensional ground-plane representations are generated based on each of the plurality of feature maps generated.

In an embodiment of the first aspect, the step of fusing the plurality of map comprises the step of concatenating the plurality three-dimensional ground-plane representations to obtain the scene-level density map.

In an embodiment of the first aspect, the plurality of images include at least one of the following differences: view angles, scene coverage and scale variations.

In an embodiment of the first aspect, the method further comprises the step of scaling the features in each of the plurality of images to a predetermined size and extracting a plurality of scale-consistent features to generate the plurality of feature maps.

In an embodiment of the first aspect, the step of scaling the features in each of the plurality of images includes upsampling a set of feature maps extracted from an image pyramid to the same size based on a fixed scale selection process.

In an embodiment of the first aspect, the step of scaling the features in each of the plurality of images includes upsampling a set of feature maps extracted from an image pyramid to the same size based on an adaptive scale selection process.

In an embodiment of the first aspect, the identification of the objects is further based on a machine-learning process.

In an embodiment of the first aspect, the identification of the objects is processed by an end-to-end deep neural network.

In an embodiment of the first aspect, the plurality of maps are generated based on processing the plurality of images using a fully-convolutional network.

In accordance with a second aspect of the present invention, there is provided a system for counting objects, comprising: a plurality of cameras arranged to obtain a plurality of images representing the objects to be counted in a target area; a mapping module arranged to generate a map for each of the plurality of images representing an identification of each of the corresponding object; and a fusion module arranged to fuse the plurality of map being generated to obtain a scene-level density map representing a count of the objects in the target area.

In an embodiment of the second aspect, each of the plurality of cameras is arranged to capture a scene representing at least a portion of the target area.

In an embodiment of the second aspect, the identification of the objects is based on identifying at least one feature of the object.

In an embodiment of the second aspect, the at least one feature include a head of the object.

In an embodiment of the second aspect, the identification of the objects is further based on head annotations on an average-height plane at a predetermined height level in a three-dimensional space.

In an embodiment of the second aspect, the mapping module is arranged to generate a three-dimensional ground-plane representation representing the identification of the objects in a two-dimensional image space covered by each of the plurality of images.

In an embodiment of the second aspect, the mapping module is further arranged to generate a plurality of view-level density maps representing a count of the objects in each of the scenes representing respective portions of the target area.

In an embodiment of the second aspect, the mapping module is further arranged to generate a plurality of feature maps representing the identified features in each of the scenes representing respective portions of the target area.

In an embodiment of the second aspect, the plurality of feature maps are generated based on an extraction of features from each of the plurality of images.

In an embodiment of the second aspect, the plurality of images include at least one of the following differences: view angles, scene coverage and scale variations.

In an embodiment of the second aspect, the mapping module is further arranged to scale the features in each of the plurality of images to a predetermined size and extracting a plurality of scale-consistent features to generate the plurality of feature maps.

In an embodiment of the second aspect, the mapping module is arranged to identify the objects based on a machine-learning process.

In an embodiment of the second aspect, the mapping module includes an end-to-end deep neural network processor.

BRIEF DESCRIPTION OF THE DRAWINGS

Embodiments of the present invention will now be described, by way of example, with reference to the accompanying drawings in which:

FIGS. 9A and 9B are illustration showing two scale selection processes used in the multi-view multi-scale early fusion method.

DETAILED DESCRIPTION OF THE PREFERRED EMBODIMENT

Figure 1:
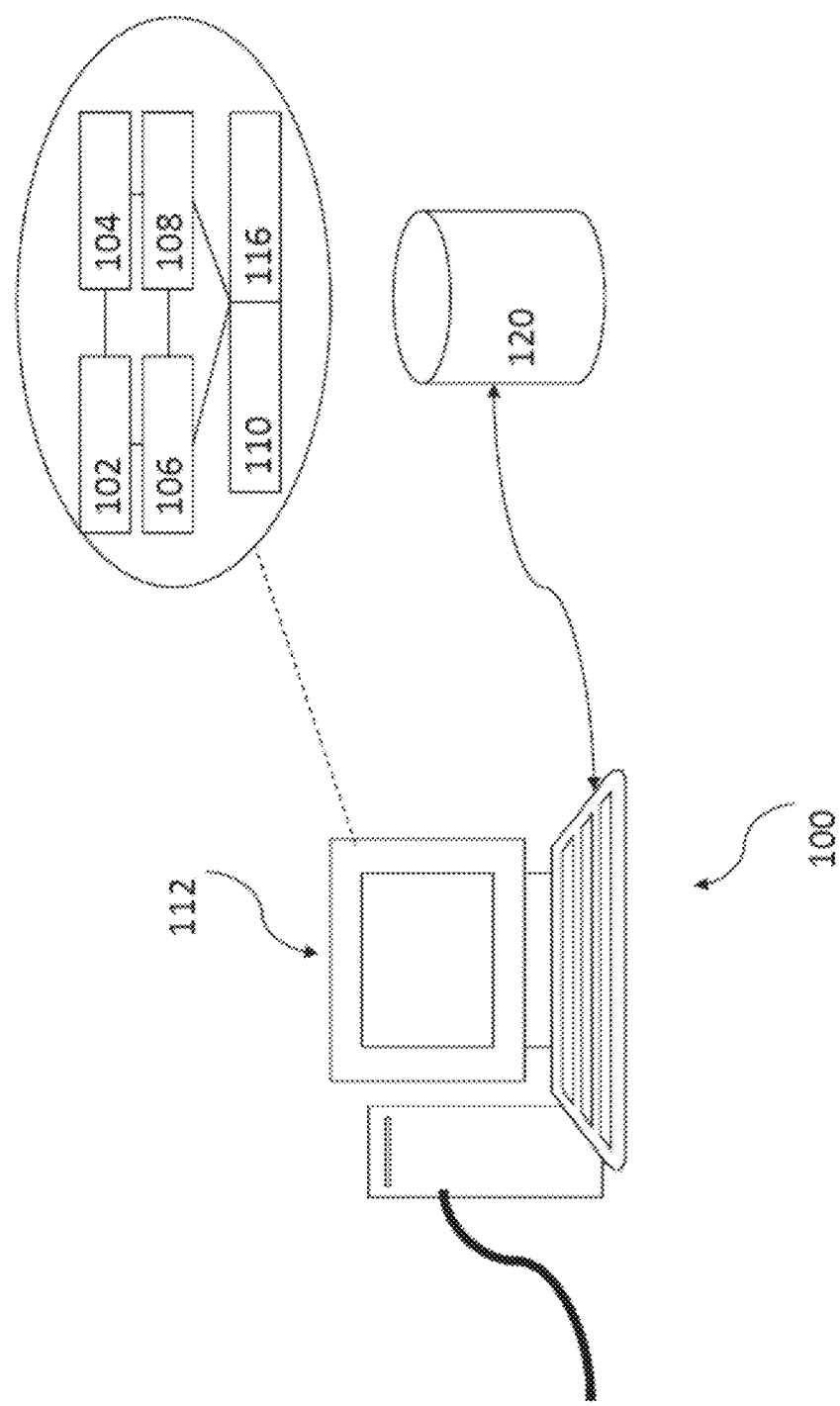
FIG. 1 is an illustration of a computer system which may be used as a system for counting objects in accordance with an embodiment of the present invention.

The inventors have, through their own research, trials and experiments, devised that crowd counting may be used to estimate the number of the people in images or videos. Preferably, it may be used in a wide range of realworld applications, such as crowd management, public safety, traffic monitoring or urban planning.

For example, crowd counting can detect overcrowding on the railway platform and help with the train schedule planning. Furthermore, the estimated crowd density map provides spatial information of the crowd, which can benefit other tasks, such as human detection and tracking.

With the strong learning ability of deep neural networks (DNNs), density map based crowd counting methods may have outstanding performance on counting datasets, where the goal is to count the crowd in a single image. However, in some examples, a single image view may not be adequate to cover a large and wide scene, such as a large park or a long train platform.

For some wide-area scenes, a single camera view cannot capture the whole scene in adequate detail for counting, either because the scene may be too large (wide) to fit within the field-of-view of the camera, or the scene is too long so that the resolution is too low in faraway regions.

Furthermore, a single view cannot count regions that are still within the scene, but are totally occluded by large objects (e.g., trees, large vehicles, building structures). Therefore, to solve the wide-area counting task, the inventors devise that multiple camera views with overlapping field of views, which combined can cover the whole scene and can see around occlusions, may be more preferable in some embodiments. Preferably, wide-area counting may utilize multiple camera views to estimate the crowd count of the whole scene.

In one example embodiments, a multi-view counting method may rely on foreground extraction techniques and hand-crafted features. However, the crowd counting performance may be limited by the effectiveness of the foreground extraction, as well as the representation ability of hand-crafted features. Considering the strong learning power of DNNs as well as the performance progress of single view counting methods using density maps, therefore, end-to-end DNN-based multiview counting methods may be preferred in some embodiments.

In accordance with a preferred embodiment of the present invention, there is provided a DNN-based multi-view counting method that extracts information from each camera view and then fuses them together to estimate a scene-level ground-plane density map.

Preferably, the method may consists of three main stages: 1) Information extraction—single view feature maps are extracted from each camera image with DNNs; 2) Information alignment—using the camera geometry, the feature maps from all cameras are projected onto the ground-plane in the 3D world so that the same person's features are approximately aligned across multiple views, and properly normalized to remove projection effects; 3) Information fusion—the aligned single-view feature maps are fused together and used to predict the scene-level ground plane density map.

Preferably, there may be three versions of the multi-view framework that differ in the kind of information that is fused. In the first embodiment, which may be referred as a late-fusion model, view-level density maps are predicted for each camera view, projected to the ground-plane, and fused for estimating the scene-level density map. In this method, a post-projection normalization method may be used to remove the projection effect that distorts the sum of the density maps (and thus the count).

In the second embodiment, which may be referred as a naïve early-fusion model, convolutional feature maps are extracted from each camera view, projected to the ground-plane and fused to predict the scene-level density map.

In the third embodiment, to handle the scale variations of the same person across camera views, a further improved model, which may be referred as a multi-view multiscale (MUMS) early-fusion model, extracts features with consistent scale across corresponding locations in the camera views before applying projection and fusion. In this method, there may be two alternatives for selecting the suitable scales, based on distances computed from the camera geometry.

With reference to FIG. 1, an embodiment of the present invention is illustrated. This embodiment is arranged to provide a system for counting objects. The system comprises: a plurality of cameras arranged to obtain a plurality of images representing the objects to be counted in a target area; a mapping module arranged to generate a map for each of the plurality of images representing an identification of each of the corresponding object; and a fusion module arranged to fuse the plurality of map being generated to obtain a scene-level density map representing a count of the objects in the target area.

Preferably, in one example, the system may be used to capture multiple images or image frames (such as in video clips or streams) each covers a scene representing at least a portion of the target area. Then the system may further process the captured source images, by using the mapping and fusing method in accordance with the embodiments of the present invention, to determine a density map of a large area which represents or indicate a count of objects, such as number of people, in the area.

In this embodiment, the mapping module and the fusion module are implemented by or for operation on a computer having an appropriate user interface. The computer may be implemented by any computing architecture, including stand-alone PC, client/server architecture, "dumb" terminal/mainframe architecture, or any other appropriate architecture. The computing device is appropriately programmed to implement the invention.

Referring to FIG. 1, there is a shown a schematic diagram of a computer or a computing server 100 which in this embodiment comprises a server 100 arranged to operate, at least in part if not entirely, the system for counting objects in accordance with one embodiment of the invention. The server 100 comprises suitable components necessary to receive, store and execute appropriate computer instructions. The components may include a processing unit 102, read-only memory (ROM) 104, random access memory (RAM) 106, and input/output devices such as disk drives 108, input devices 110 such as an Ethernet port, a USB port, etc. Display 112 such as a liquid crystal display, a light emitting display or any other suitable display and communications links 114. The server 100 includes instructions that may be included in ROM 104, RAM 106 or disk drives 108 and may be executed by the processing unit 102. There may be provided a plurality of communication links 114 which may variously connect to one or more computing devices such as a server, personal computers, terminals, wireless or handheld computing devices. At least one of a plurality of communications link may be connected to an external computing network through a telephone line or other type of communications link.

The server may include storage devices such as a disk drive 108 which may encompass solid state drives, hard disk drives, optical drives or magnetic tape drives. The server 100 may use a single disk drive or multiple disk drives. The server 100 may also have a suitable operating system 116 which resides on the disk drive or in the ROM of the server 100.

The system has a database 120 residing on a disk or other storage device which is arranged to store at least one record 122. The database 120 is in communication with the server 100 with an interface, which is implemented by computer software residing on the server 100. Alternatively, the database 120 may also be implemented as a stand-alone database system in communication with the server 100 via an external computing network, or other types of communication links.

Figure 2:
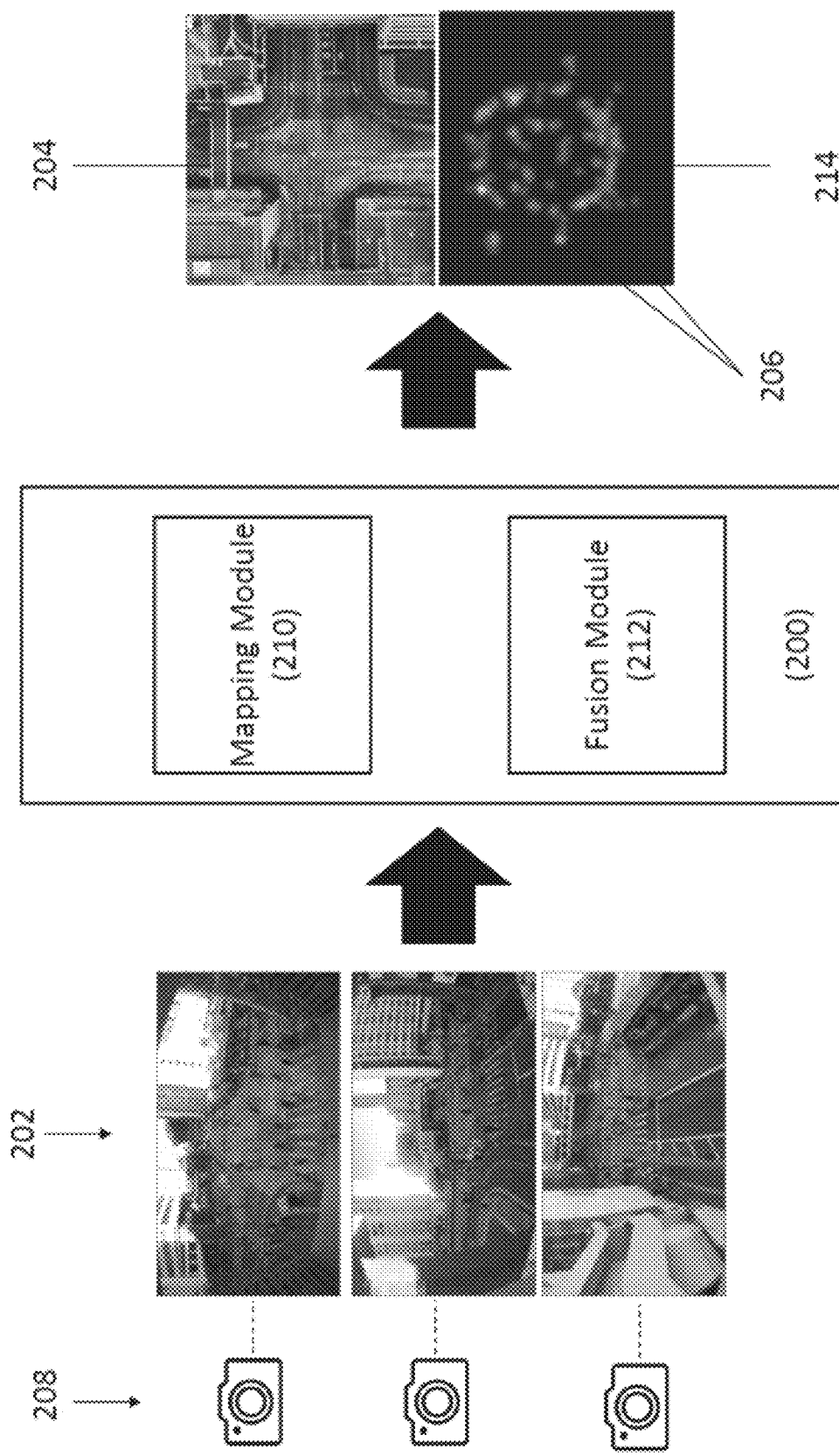
FIG. 2 is a block diagram of a system for counting objects in accordance with an embodiment of the present invention, wherein the input images are processed by the system to obtain the scene map and corresponding scene-level density map.

With reference to FIG. 2, there is shown an embodiment of the system 200 for counting objects in the captured images. In this embodiment, the system is used to process the images 202 which capture different parts of a target area 204 or terrain, especially to identify objects of interest 206 and to count a number of objects 206 in the images 202. For example, the system 200 may identify a number of people in each of the images 202 captured by multiple cameras 208 (or received from other source of input), and then may determine a total number of people based on a fusion model applied to consolidate the discrete input data.

For example, the mapping module 210 of the system may simply identify respectively the number of people 206 in each of the images 202 captured, as well as the number of duplicates in all the processed images 202. In general, overlapping portions may facilitate stitching of images, and therefore it is possible that duplicates are also captured in multiple images, and thus it is necessary to considers the number of duplicates the consolidating the discrete data. After that, the fusion module 212 may further fuse or combined the results obtained by the mapping module 210. For example, the fusion module may derive a combined image and/or a combined density map 214 which indicates a density or the number of objects in the target area.

In single-view counting methods, for example, it may be divided into 3 categories: detection, regression, and density map methods. Detection methods may try to detect each person in the images by extracting hand-crafted features and then training a classifier using the extracted features. However, the detection methods may not perform well when the people are heavily occluded, which limits their application scenarios.

Alternatively, regression methods may extract the image features and learns a mapping directly to the crowd count. But their performance may be limited by the weak representation power of the hand-crafted low-level features.

In yet an alternative example, instead of directly obtaining the counting number, the system may estimate density maps, where each pixel in the image contains the local crowd density, and the count is obtained by summing over the density map. Density map methods may learn the mapping between the handcrafted local features and the density maps. The density maps may represent a number of counts or identification results.

Preferably, the mapping module 210 may include an end-to-end deep neural network processor, which may identify the objects based on a machine-learning process. In one preferred embodiment, the crowd counting method may be implemented with different DNNs that analyses the results based on density map estimations. For example, a standard CNN may be used to directly estimate the density map from an image. However, the inventors devise that scale variation may be an issue in crowd counting, due to perspective effects in the image.

Alternatively, a multi-column CNN (MCNN) method may be applied, which is consisting of 3 columns of different receptive field sizes, and can model people of different scales. A switch module may also be added in the MCNN structure to choose the optimal column to match the scale of each patch.

In some alternative embodiments, patch pyramids may be used as input to extract multiscale features. Similarly, an image pyramid with a scale-selecting attention block may use applied to adaptively fuse predictions on different scales.

Some example network structures may also incorporate global and local context information in the crowd counting framework, and to obtain the contextual pyramid CNN (CP-CNN). Alternatively, an adaptive convolution neural network (ACNN) may use side information (camera angle and height) to include context into the counting framework. Scale aggregation module to extract multi-scale features and generated high-resolution density maps by using a set of transposed convolutions.

All these methods may employ DNNs to estimate a density map on the image plane of a single camera-view, with different architectures for improving the performance across scenes and views.

In a preferred embodiment, the fusion module 212 fuses or combines multiple camera views of the same scene to obtain a ground-plane density map in the 3D world, so as to obtain a scene-level density map representing a count of the objects in a larger target area.

Similar to single view, multi-view counting methods may also be divided into 3 categories, namely detection/tracking, regression, 3D cylinder methods.

For example, the detection/tracking methods first perform detection or tracking on each scene and obtain singleview detection results. Then, the detection results from each view are integrated by projecting the single-view results to a common coordinate system, e.g., the ground plane or a reference view. The count of the scene is obtained by solving a correspondence problem.

Regression based methods first extract foreground segments from each view, then build the mapping relationship of the segments and the count number with a regression model.

3D cylinder-based methods may try to find the people's locations in the 3D scene by minimizing the gap between the people's 3D positions projected into the camera view and the single view detection.

These example multi-view counting methods are mainly based on hand-crafted low-level features and regression or detection/tracking frameworks, which may be further used for counting objects in multiple view. However, regression-based methods only give the global count, while detection/tracking methods cannot cope well with occlusions when the scene is very crowded.

Alternatively, in accordance with one embodiment of the present invention, the method is based on predicting the ground-plane density map in the 3D world by fusing the information across camera views using DNNs.

Some advantages of the embodiments of the invention will be further explained in details. These include at least the abilities to learn the feature extractors and fusion stage in end-to-end training, and to estimate the spatial arrangement of the crowd on the ground plane.

Figure 3:
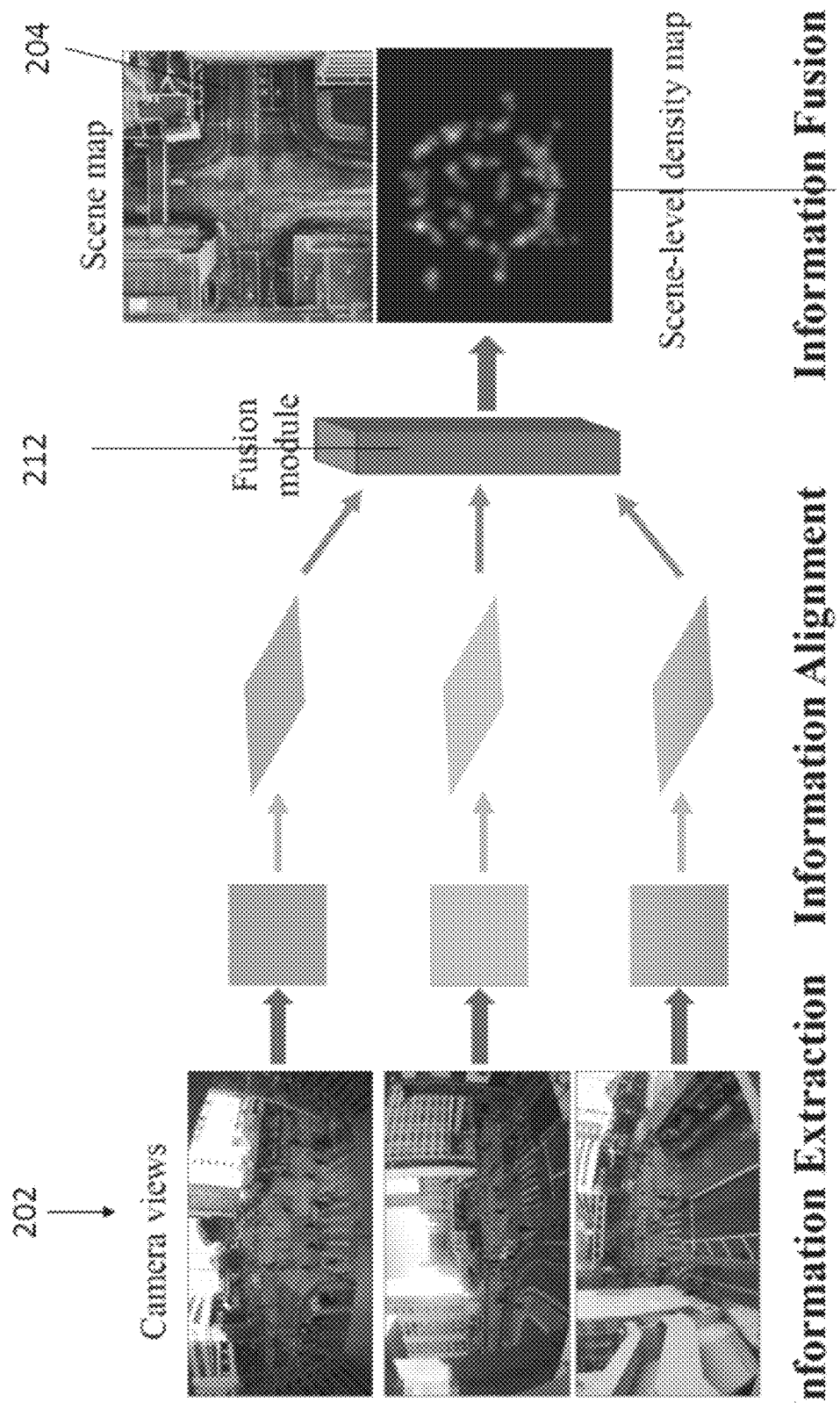
FIG. 3 is an illustration of a flow diagram of a method of counting objects in accordance with an embodiment of the present invention.

For multi-view counting, in some example, it may be assumed that the cameras 208 are fixed, the camera calibration parameters (both intrinsic and extrinsic) are known, and that the camera frames across views are synchronized. Based on these assumptions, and given the set of multi-view images, the system may predict a scene-level density map defined on the ground-plane of the 3D scene, referring to FIG. 3.

In this example, the ground-truth ground-plane density map 214 is obtained in a similar way as the previously discussed camera-view density map—the ground-plane annotation map is obtained using the groundtruth 3D coordinates of the people, which is then convolved by a fixed-width Gaussian to obtain the density map 214.

Preferably, different fusion methods may be used in multi-view counting, including but not limited to: 1) a late fusion model which projects camera-view density maps onto the ground plane and then fuses them together, which may require a projection normalization step to obtain a correct result; 2) a naïve early fusion model which projects camera-view feature maps onto the ground plane then fuses them; 3) to handle inter-view and intra-view scale variations, the multi-view multi-scale early fusion model (MVMS) selects features scales to be consistent across views when projecting to the same ground-plane point.

These methods may share some common steps or feature, for example, the feature identification methods that may involve an image processing step to extract the desired information presented in the source images.

A fully-convolutional network (denoted as FCN-7) may be used on each camera view to extract image feature maps or estimate a corresponding view-level density map. The FCN-7 settings are shown in the following table. FCN-7 may be used to effectively fuse multi-view information to perform wide-area crowd counting, although more complex DNNs, may be applied to the camera-views for processing the images.

TABLE 1

| Layer | Filter |
|---|---|
| FCN-7 | |
| conv 1 | 16 × 1 × 5 × 5 |
| conv 2 | 16 × 16 × 5 × 5 |
| pooling | 2 × 2 |
| conv 3 | 32 × 16 × 5 × 5 |
| conv 4 | 32 × 32 × 5 × 5 |
| pooling | 2 × 2 |
| conv 5 | 64 × 32 × 5 × 5 |
| conv 6 | 32 × 64 × 5 × 5 |
| conv 7 | 1 × 32 × 5 × 5 |
| Fusion | |
| concat | — |
| conv 1 | 64 × n × 5 × 5 |
| conv 2 | 32 × 64 × 5 × 5 |
| conv 3 | 1 × 32 × 5 × 5 |

Figure 4:
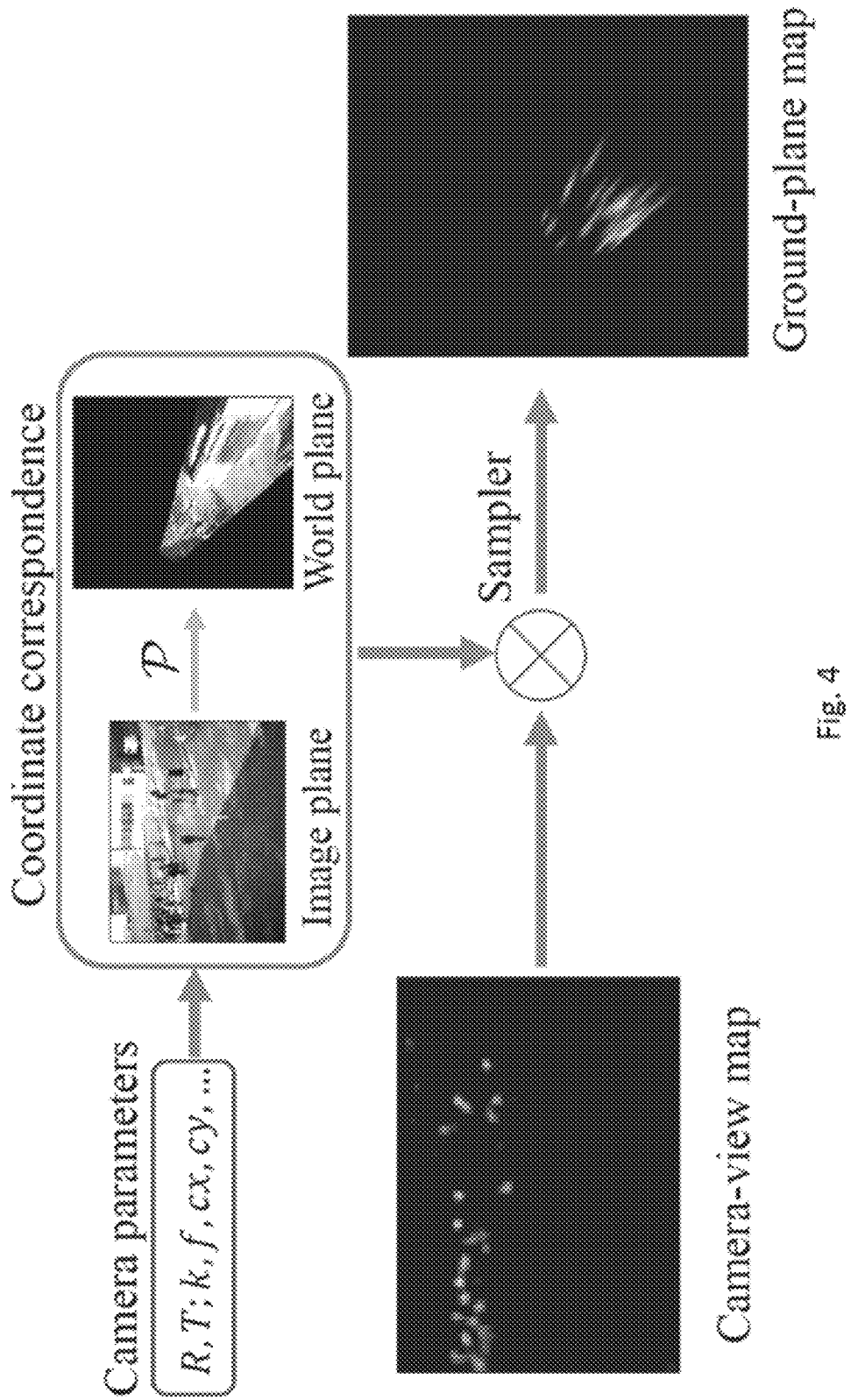
FIG. 4 is an illustration of an example operation of the mapping module of the system in FIG. 2, the camera-view maps are transformed to a ground-plane representation, and the camera-view map is visualized as a density map.

With reference to FIG. 4, assuming that the intrinsic and extrinsic parameters of the cameras are known, the projection from a camera's 2D image space to a 3D ground-plane representation can be implemented as a differentiable fixed-transformation module.

Preferably, the identification of the objects is based on identifying at least one feature of the object, such as but not limited a head, or an overall skeleton or outline of the objects as shown in the images. For example, the identification of the objects may be further based on head annotations on an average-height plane at a predetermined height level in a three-dimensional space, and subsequently, the mapping module may further generates a three-dimensional ground-plane representation representing the identification of the objects in a two-dimensional image space covered by each of the plurality of images.

In one example, the 3D height (z-coordinate) corresponding to each image pixel may be unknown. Since the view-level density maps are based on head annotations and the head is typically visible even during partial occlusion, it may be assumed that each pixel's height in the 3D world is a person's average height (1750 mm). The camera parameters together with the height assumption are used to calculate the correspondence mapping P between 2D image coordinates and the 3D coordinates on the 3D average-height plane. Finally, the sampler from a Spatial Transformation Network may be used to implement the projection, resulting in the groundplane representation of the input map.

In one example fusion model as discussed above, the mapping module generates a plurality of view-level density maps representing a count of the objects in each of the scenes representing respective portions of the target area, a plurality three-dimensional ground-plane representations may be generated based on each of the plurality of view-level density maps generated.

Preferably, the fusion module may perform the step of concatenating the plurality three-dimensional ground-plane representations to obtain the scene-level density map, so as to fuse the plurality of maps.

In this fusion method, by applying the late fusion model, the mapping module first estimate the density maps in each camera view, and then the fusion modules may fuse them together to obtain the scene-level density map.

Figure 5:
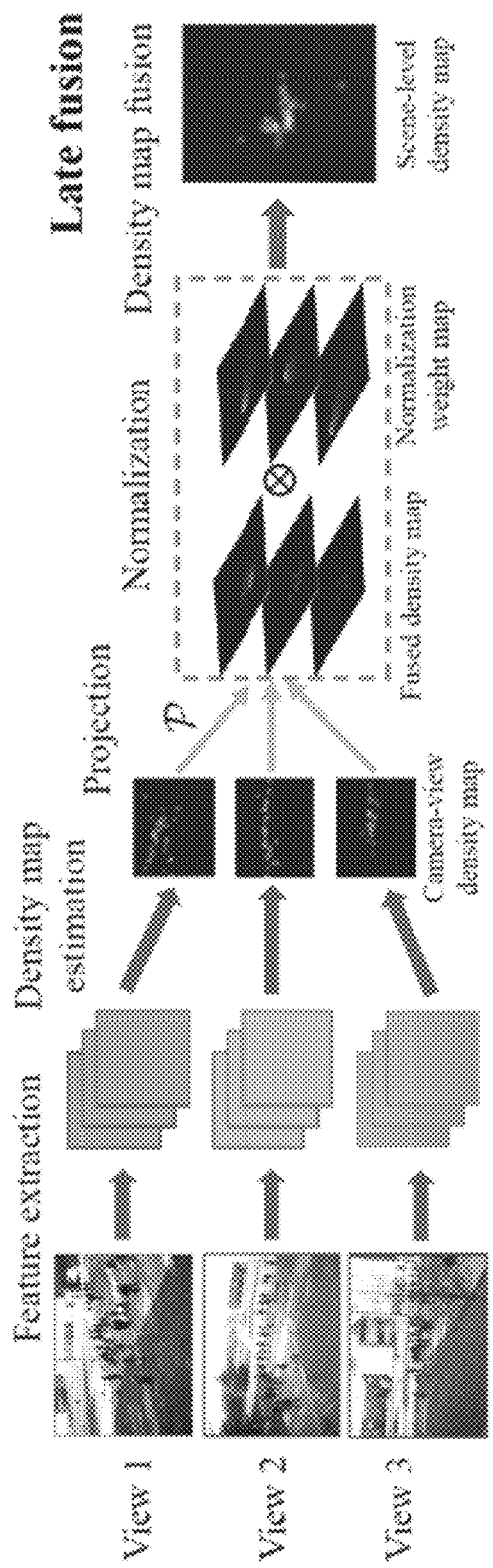
FIG. 5 is an illustration of a flow diagram of a late fusion method of counting objects in accordance with an embodiment of the present invention.

With reference also to FIG. 5, the late fusion model may consist of 3 stages: 1) estimating the camera-view density maps using FCN-7 on each view; 2) projecting the density maps to the ground-plane representation using the projection module; 3) concatenating the projected density maps channel-wise and then applying the Fusion module to obtain the scene-level density map. The network settings for the fusion network are presented in Table 1 above.

In some example process, the density map may be stretched during the projection step, and thus the sum of the density map changes after the projection. To solve this problem, the method further comprises the step of normalizing the plurality three-dimensional ground-plane representations.

Figure 6:
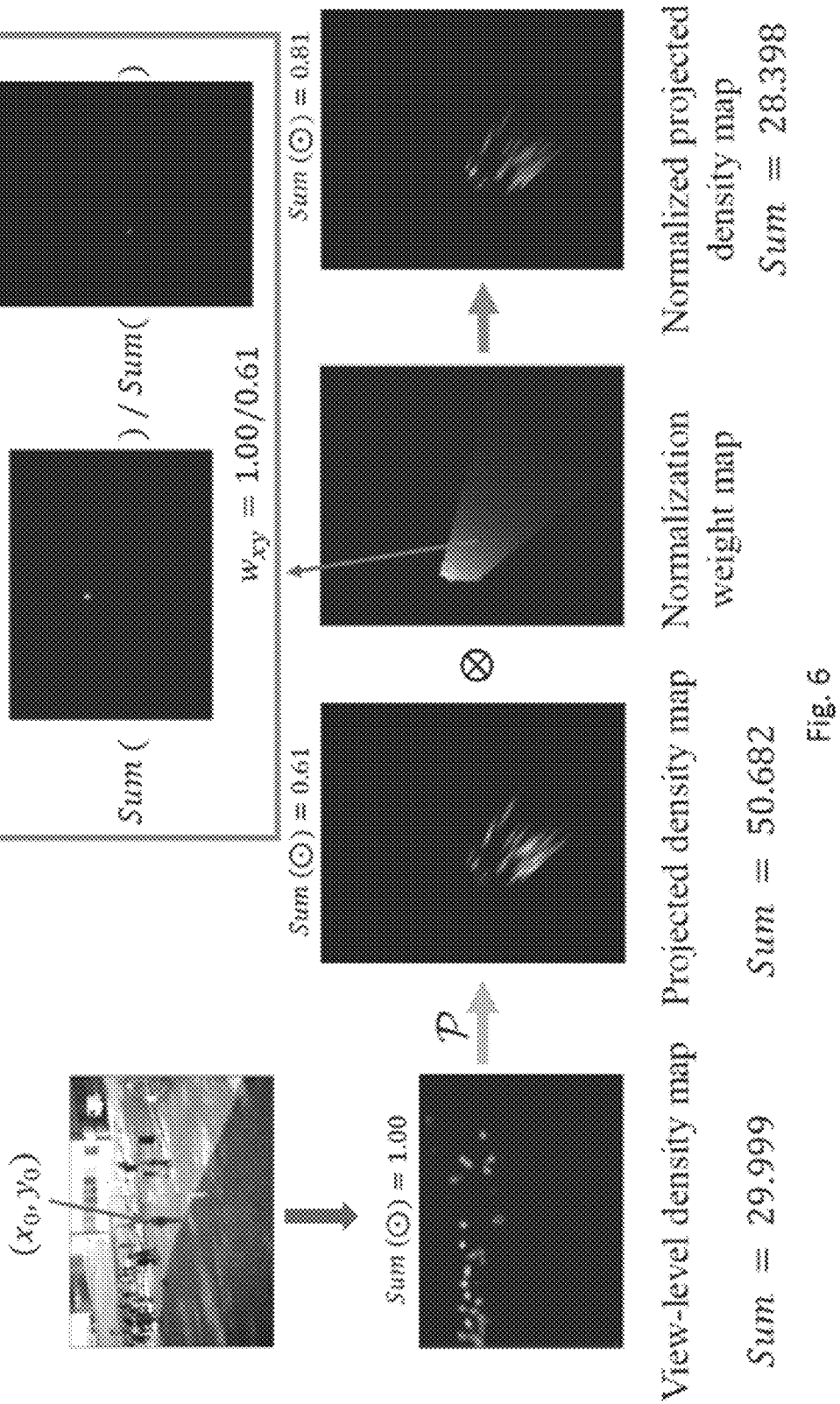
FIG. 6 is an illustration of a normalization process for the late fusion model, in which Sum is the sum of the whole density map, and Sum($\odot$) is the sum over the circled region.

With reference to FIG. 6, considering that the density map is composed of a sum of Gaussian kernels, each Gaussian is stretched differently depending on its location in the image plane. To address this problem, a normalization step may be added to ensure that the sum of each Gaussian kernel remains the same after projection. Preferably, let ($x_0$; $y_0$) and (x; y) be the corresponding points in the image plane and the 3D world ground-plane representation. The normalization weight $w_{xy}$ for ground-plane position (x; y) is:

$$w_{xy} = \frac{\sum_{ij} D_{x_0, y_0}(i, j)}{\sum_{mn} \mathcal{P}(D_{x_0, y_0}(m, n))} \quad (1)$$

wherein: $D_{x_0, y_0}$ denotes an image-space density map containing only one Gaussian kernel centred at ($x_0$, $y_0$); P is a projection operation from image space to ground plane; and (i, j) and (m, n) are respectively image coordinates and ground plane coordinates.

The normalization map W=[$w_{xy}$] for each camera is element-wise multiplied to the corresponding projected density map before concatenation. Referring to FIG. 6, after normalization, the summation of the projected density map remains similar to that of the original view-level density map.

In accordance with an alternative embodiment, the step of generating the map for each of the plurality of images comprises the step of generating a plurality of feature maps representing the identified features in each of the scenes representing respective portions of the target area, and a plurality three-dimensional ground-plane representations may be generated based on each of the plurality of feature maps generated. Similar to the previous embodiment, the plurality of feature maps may be generated based on an extraction of features from each of the plurality of images.

In this example, by applying the naïve early fusion model, the mapping module directly fuses the feature maps from all the camera-views to estimate the groundplane density map. Similar to the late fusion model, some of the steps in the early fusion model are replaced, in which the density map-level fusion is replaced with feature-level fusion. Subsequently, the fusion module concatenates the plurality three-dimensional ground-plane representations to obtain the scene-level density map.

Figure 7:
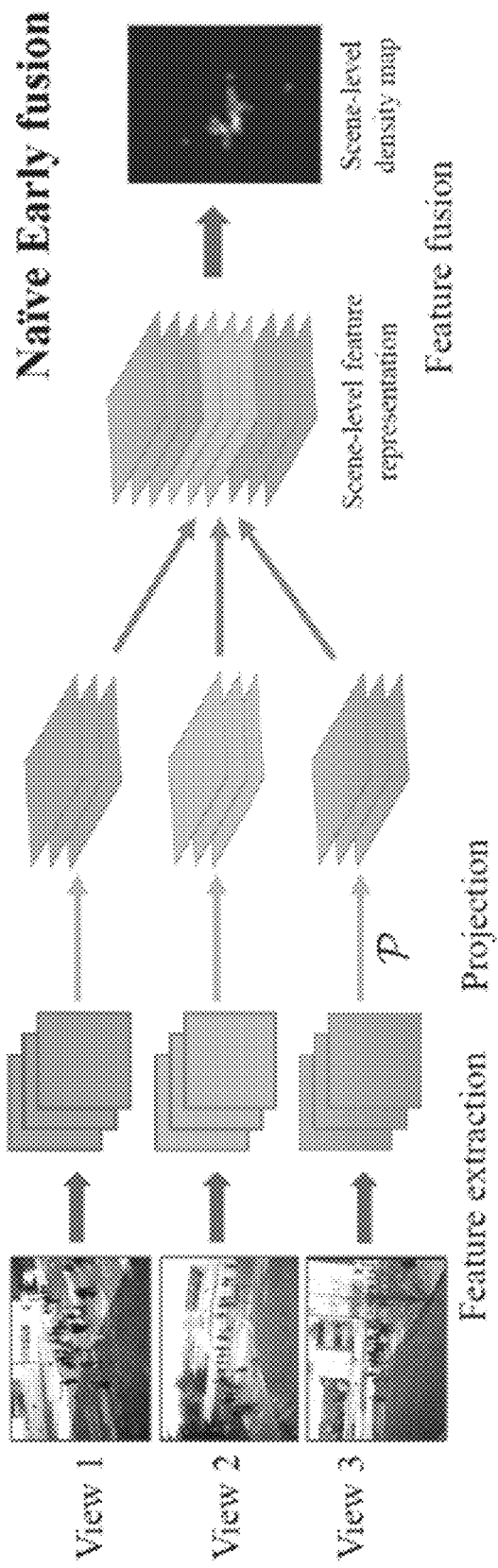
FIGS. 7 and 8 are two alternative methods of counting objects in accordance with embodiments of the present invention.

With reference to FIG. 7, the naïve early fusion model consists of 3 stages: 1) extracting feature maps from each camera view using the first 4 convolution layers of FCN-7; 2) projecting the image feature maps to the ground-plane representation using the projection module; 3) concatenating the projected feature maps and applying the Fusion module to estimate the scene-level density map. Preferably, the projection normalization step used in the late fusion model is not required for the early fusion model, since feature maps do not have the same interpretation of summation yielding a count.

As the images may be individually captured by different cameras or imager, the plurality of images may include at least one of the following differences: view angles, scene coverage and scale variations. With one or more of these differences, the size of the objects and hence the corresponding features presented on the images may be different from each other.

Intra-view scale variations may be an important issue in single-view counting, as people will appear with different sizes in the image due to perspective effects. Using multiple views increases the severity of the scale variation issue; in addition to intra-view scale variation, multi-view images have inter-view scale variations, where the same person will appear at different scales across multiple views. This inter-view scale variation may cause problems during the fusion stage as there are a combinatorial number of possible scales appearing across all views, which the network needs to be invariant to.

To address this problem, it may be preferable to extract feature maps at multiple scales, and then perform scale selection so that the projected features are at consistent scales across all views (i.e., a given person appears at the same scale across all views).

Figure 8:
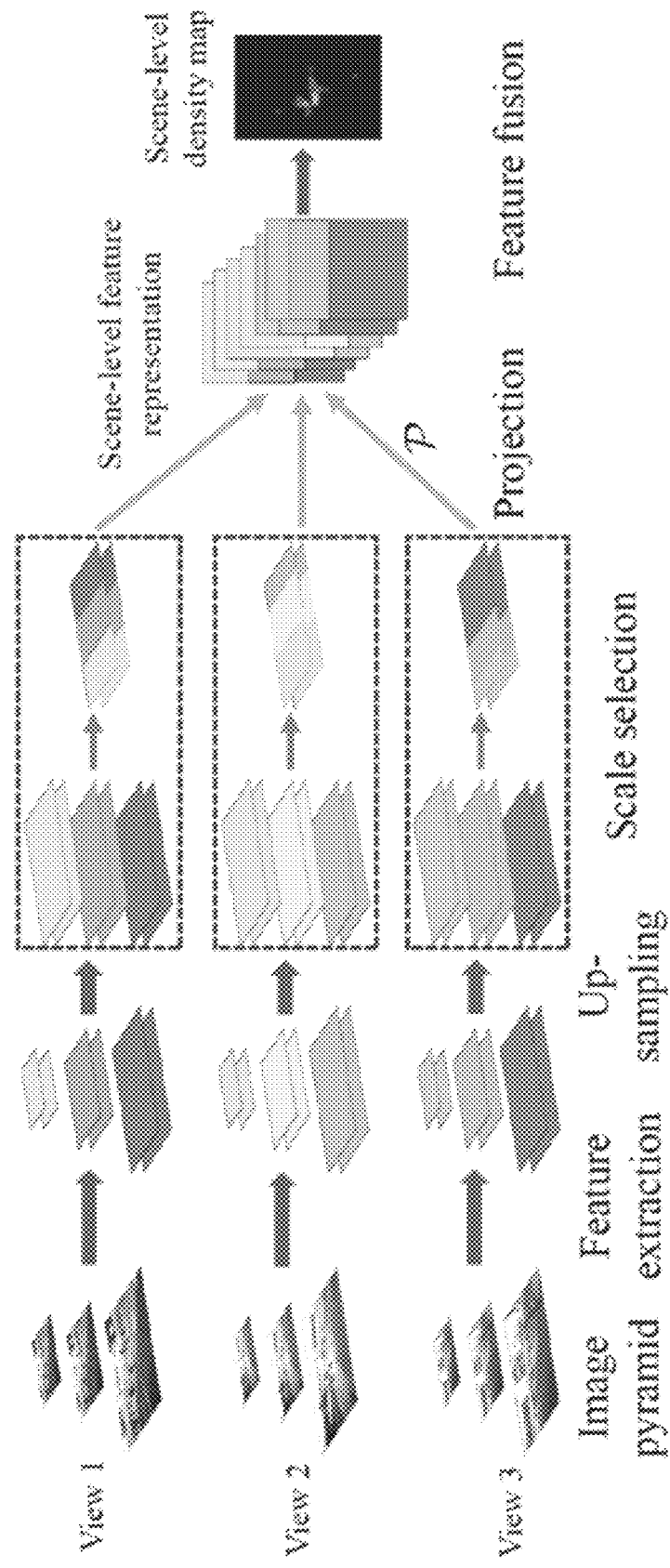

With reference to FIG. 8, the mapping module may further scale the features in each of the plurality of images to a predetermined size and extracting a plurality of scale-consistent features to generate the plurality of feature maps.

In this multi-view multi-scale (MVMS) early fusion architecture, The MVMS fusion model consists of 4 stages: 1) extracting multi-scale feature maps by applying the first 4 convolution layers of FCN-7 on an image pyramid for each camera view; 2) upsampling all the feature maps to the largest size, and then selecting the scales for each pixel in each camera-view according to the scene geometry; 3) projecting the scale-consistent feature maps to the ground-plane representation using the projection module; 4) fusing the projected features and predicting a scene-level density map using the fusion module. Two different methods for selecting the consistent scales may be used, namely a fixed scale selection process and a learnable scale selection process.

In the fixed scale-selection, preferably, the step of scaling the features in each of the plurality of images includes upsampling a set of feature maps extracted from an image pyramid to the same size based on a fixed scale selection process.

With reference to FIG. 9A, for a given camera, let $\{F_0, \ldots, F_n\}$ be the set of feature maps extracted from the image pyramid, and then upsampled to the same size. Here $F_0$ is the original scale and $F_n$ is the smallest scale. A distance map is computed for the camera-view, where $d(x_0; y_0)$ is the distance between the camera's 3D location and the projection of the point $(x_0; y_0)$ into the 3D-world (on the average height plane). A scale selection map S, where each value corresponds to the selected scale for that pixel, is computed using the distance map, $$S(x_0, y_0) = s_r - \left\lfloor \log_z \frac{d(x_0, y_0)}{d_r} \right\rfloor \quad (2)$$

where z is the zoom factor between neighboring scales in the image pyramid, and $\lfloor \cdot \rfloor$ is the floor function. $d_r$ and $s_r$ are the reference distance and the corresponding reference scale number, which are the same for all camera-views.

In one example, the reference distance $d_r$ may be set as the distance value for the center pixel of the first view, and $s_r$ as the middle scale of the image pyramid. Given the scale selection map S, the feature maps across scales are merged into a single feature map, $F = \Sigma_i \mathbb{1}(S=i) \otimes F_i$, where $\otimes$ is element-wise multiplication, and $\mathbb{1}$ is an element-wise indicator function.

Alternatively, in a learnable scale-selection process, the step of scaling the features in each of the plurality of images includes upsampling a set of feature maps extracted from an image pyramid to the same size based on an adaptive scale selection process.

With reference to FIG. 9B, the fixed scale selection strategy requires setting the reference distance and reference scale parameters. To make the scale selection process more adaptive to the view context, a learnable scale-selection model is considered, $$M_i(x_0, y_0) = \frac{e^{-(S(x_0, y_0)-i)^2}}{\sum_{j=0}^{n} e^{-(S(x_0, y_0)-j)^2}} \quad (3)$$

where the learnable parameter b corresponds to the reference scale, and k adjusts the reference distance. The learnable scale selection can be implemented as a 1×1 convolution on the log distance map. Then, a soft scale selection mask $M_i$ for scale i can be obtained, $$M_i(x_0, y_0) = \frac{e^{-(S(x_0, y_0)-i)^2}}{\sum_{j=0}^{n} e^{-(S(x_0, y_0)-j)^2}} \quad (4)$$

The scale consistent feature map is then $F = \Sigma_i M_i \otimes F_i$.

As discussed above, the the identification of the objects is further based on a machine-learning process, a two-stage process may be applied to train the model. At the first stage, the single-view density maps together with the scene-level density maps are used as supervisory information.

The inventors have carried out experiments to evaluate the performances of the system for counting objects accordance with embodiments of the present invention. Each single-view FCN-7 backbone is trained using the camera-view images and the corresponding single-view density maps. The learning rate is set to 1e-4. In the second stage, the supervisory information of the single-view density maps is removed. FCN-7 (either density map estimator or feature extractor) is fixed and the fusion and scale selection parts are trained. The loss function is the pixel-wise squared error between the ground-truth and predicted density maps. The learning rate is set to 1e-4, and decreases to 5e-5 during training. After training the two stages, the model is fine-tuned end-to-end. The training batch-size is set to 1 in all experiments.

In one experiment, two example datasets, PETS2009 and DukeMTMC, and an additional City Street dataset were tested. With reference to Table 2 below and also FIG. 10, the results are as follows.

TABLE 2

| Dataset | resolution | view | train/test | crowd |
|---|---|---|---|---|
| PETS2009 | 768 × 576 | 3 | 1105/794 | 20-40 |
| DukeMTMC | 1920 × 1080 | 4 | 700/289 | 10-30 |
| City Street | 2704 × 1520 | 3 | 300/200 | 70-150 |

PETS2009 is a multi-view sequence dataset containing crowd activities from 8 views. The first 3 views are used for the experiments, as the other 5 views have low camera angle, poor image quality, or unstable frame rate. To balance the crowd levels, the experiments use sequences S1L3 (14 17, 14 33), S2L2 (14 55) and S2L3 (14 41) for training (1105 images in total), and S1L1 (13 57, 13 59), S1L2 (14 06, 14 31) for testing (794 images). The calibration parameters (extrinsic and intrinsic) for the cameras are provided with the dataset.

To obtain the annotations across all views, the system project View 1 annotations to other views followed by manual annotations to get all the people heads in the images.

DukeMTMC is a multi-view video dataset for multi-view tracking, human detection or ReID. The multi-view video dataset has video from 8 synchronized cameras for 85 minutes with 1080p resolution at 60 fps. For the counting experiments, 4 cameras (cameras 2, 3, 5 and 8) that have overlapping fields-of-view were used. The synchronized videos are sampled every 3 seconds, resulting in 989 multi-view images. The first 700 images are used for training and the remaining 289 for testing. Camera extrinsic and homography parameters are provided by the dataset.

Figure 10:
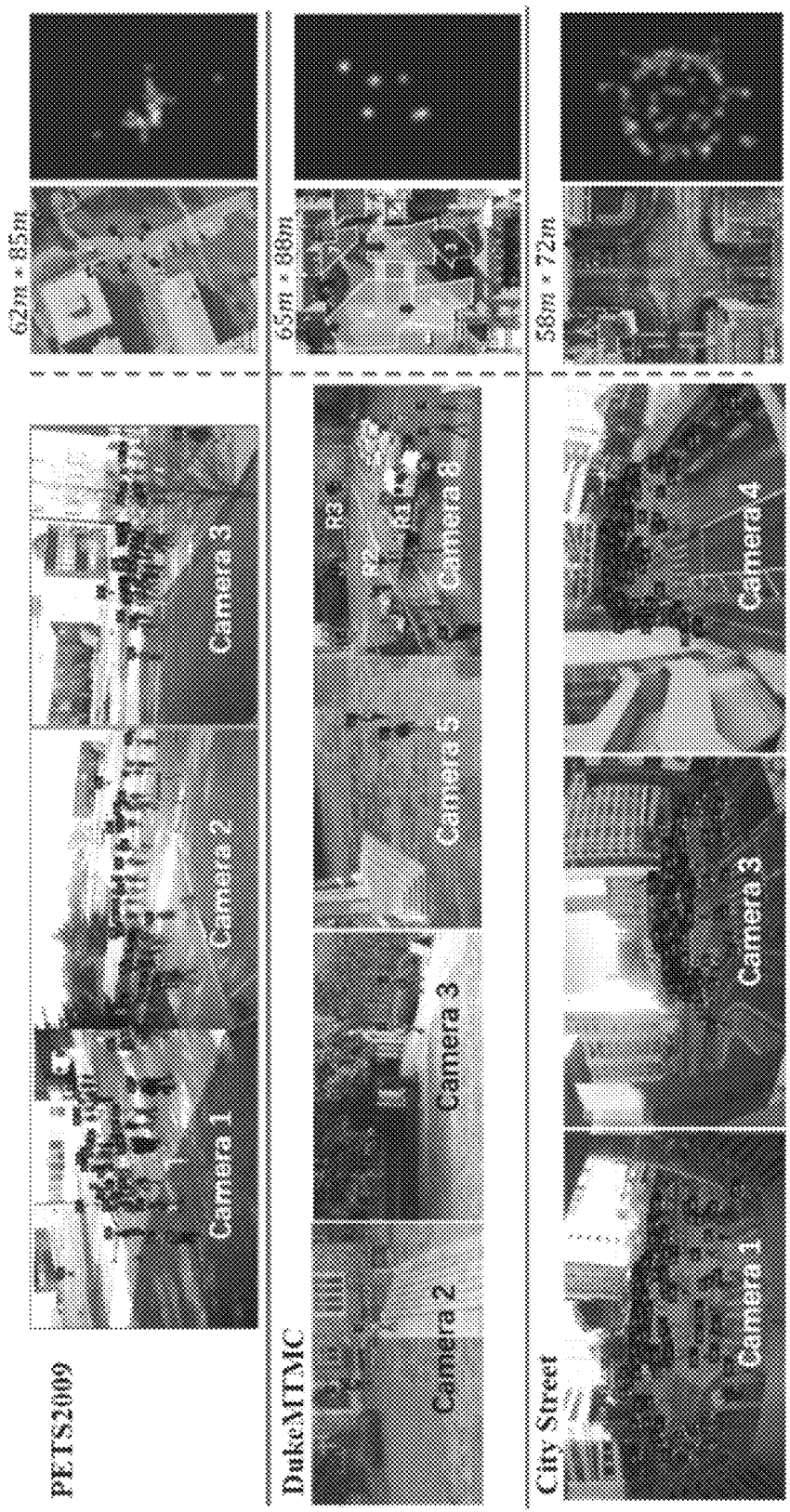
FIG. 10 are images and corresponding density maps obtained based on three different multi-view counting datasets.

In the original dataset, annotations for each view are only provided in the view ROIs, which are all non-overlapping on the ground-plane. Since overlapping cameras may be more of interests, the system projected the annotations from each camera view to the overlapping areas in all other views. Region R2 as shown in FIG. 10 is excluded during the experiment, since there are no annotations provided there.

The inventors also collected a multi-view video dataset of a busy city street using 5 synchronized cameras. The videos are about 1 hour long with 2.7 k (2704_1520) resolution at 30 fps. Cameras 1, 3 and 4 were selected for the experiment. The cameras' intrinsic and extrinsic parameters are estimated using a calibration algorithm. 500 multi-view images are uniformly sampled from the videos, and the first 300 are used for training and remaining 200 for testing. The ground-truth 2D and 3D annotations are obtained as follows. The head positions of the first camera-view are annotated manually, and then projected to other views and adjusted manually.

Next, for the second camera view, new people (not seen in the first view), are also annotated and then projected to the other views. This process is repeated until all people in the scene are annotated and associated across all camera views. Our dataset has larger crowd numbers (70-150), compared with PETS (20-40) and DukeMTMC (10-30). The city view dataset also contains more crowd scale variations and occlusions due to vehicles and fixed structures.

In these experiments, the image resolutions (w×h) used in the experiments are: 384×288 for PETS2009, 640×360 for DukeMTMC, and 676×380 for City Street. The resolutions of the scene-level ground-plane density maps are: 152×177 for PETS2009, 160×120 for DukeMTMC and 160×192 for City Street. For the detection baseline, the original image resolutions are used (Faster-RCNN will resize the images).

The different multi-view fusion models (denoted as "Late fusion", "Naïve early fusion", and "MUMS" (multi-view multi-scale early fusion)) in accordance with embodiments of the present invention were also evaluated, using the dataset images obtained as discussed above. The late fusion model uses projection normalization. MVMS uses learnable scale selection, and a 3-scale image pyramid with zoom factor of 0.5. The settings were also tested in an ablation study.

For comparisons, two example baseline methods were also included in the evaluation experiments. The first baseline is a simple method to fusing camera-view density maps into a scene-level count, denoted as "Dmap weighted". In this method, FCN-7 is first applied to get the density map $D_i$ for each camera-view. The density maps are then fused into a scene-level count using a weight map $W_i$ for each view, $$C = \sum_i \sum_{x_0, y_0} W_i(x_0, y_0) D_i(x_0, y_0) \qquad (5)$$

where the summations are over the camera-views and the image pixels. The weight map $W_i$ is constructed based on how many views can see a particular pixel. In other words, $W_i(x_0, y_0) = 1/t$, where t is the number of views that can see the projected point $P(x_0, y_0)$.

The simple fusion method may be used with traditional regression-based counting (e.g. the Di map may be based on the predicted counts for crowd blobs). Here, the recent DNN-based methods and crowd density maps may be used instead, which outperform traditional regression-based counting, and hence form a stronger baseline method compared to some example methods.

The second baseline is using human detection methods and person re-identification (ReID), denoted as "Detection+ReID". First, Faster-RCNN is used to detect humans in each camera-view. Next, the scene geometry constraints and the ReID method—LOMO 2015 are used to associate the same people across views. Specifically, each detection box's top-center point in one view is projected to other views, and ReID is performed between the original detection box and detection boxes near the projected point in other views. Finally, the scene-level people count is obtained by counting the number of unique people among the detection boxes in all views. The bounding boxes needed for training are created with the head annotations and the perspective map of each view.

The mean absolute error (MAE) is used to evaluate multi-view counting performance, comparing the scene-level predicted counts and the ground-truth scenelevel counts. In addition, the MAE of the predicted counts in each camera-view can also be evaluated. The ground-truth count for each camera-view is obtained by summing the ground-truth scene-level density map over the region covered by the camera's field-of-view. In the experiments, people that are totally occluded from the camera, but still within its field-of-view, are still counted.

The experimental results are shown in Table 3 below. On PETS2009, the three multi-view fusion models can achieve better results than the two comparison methods in terms of both single-view counting and scene-level counting. Detection+ReID performs worst on this dataset because the people are close together in a crowd, and occlusion causes severe misdetection.

Among the three multi-view fusion models, naïve early fusion performs worse, which suggests that the scale variations in multi-view images limits the performance. Furthermore, MVMS performs much better than other models, which shows the multi-scale framework with scale selection strategies can improve the feature-level fusion to achieve better performance.

TABLE 3

| | Dataset | | | | | | | | | | | | |
|---|---|---|---|---|---|---|---|---|---|---|---|---|---|
| | PETS 2009 | | | | DukeMTMC | | | | | City Street | | | |
| | Camera | | | | | | | | | | | | |
| | 1 | 2 | 3 | scene | 2 | 3 | 5 | 8 | scene | 1 | 3 | 4 | scene |
| Dmap weighted | 3.37 | 5.59 | 5.84 | 7.51 | 0.62 | 0.91 | 0.98 | 1.41 | 2.12 | 10.16 | 12.55 | 21.56 | 11.1 |
| Detection + ReID | 8.60 | 11.19 | 14.61 | 9.41 | 2.06 | 0.25 | 0.96 | 3.58 | 2.20 | 41.38 | 32.94 | 28.57 | 27.50 |
| Late fusion (ours) | 2.62 | 3.17 | 3.97 | 3.92 | 0.49 | 0.77 | 0.39 | 1.15 | 1.27 | 8.14 | 7.72 | 8.08 | 8.12 |
| Naïve early fusion (ours) | 2.37 | 4.27 | 4.92 | 5.43 | 0.64 | 0.44 | 0.93 | 1.72 | 1.25 | 8.13 | 7.62 | 7.89 | 8.10 |
| MVMS (ours) | 1.66 | 2.58 | 3.46 | 3.49 | 0.63 | 0.52 | 0.94 | 1.36 | 1.03 | 7.99 | 7.63 | 7.91 | 8.01 |

On DukeMTMC, the multi-view fusion models can achieve better performance than comparison methods at the scene-level and on most camera-views. Detection+ReID achieves the best result on camera 3 because this camera is almost parallel to the horizontal plane, has low people count, and rarely has occlusions, which is an ideal operating regime for the detector. Due to lower crowd numbers in Duke-MTMC, the performance gap among the 3 fusion models is not large, but MVMS still performs best.

On City Street, the multi-view fusion models achieve better results than the comparison methods. Compared to PETS2009, City Street has larger crowds and more occlusions and scale variations. Therefore, the performance of the baseline methods decreases a lot, especially Detection+ReID. Our MVMS model achieves better performance than all other models.

The inventors also perform an ablation study on the late fusion model with and without the projection normalization step, and the results are presented in Table 4. Using projection normalization reduces the error of the late fusion model, compared to not using the normalization step. The inventors also performed an ablation study on the scale-selection strategy of MVMS, and the results are presented in Table 4 below. Most of the time the learnable scale-selection strategy can achieve lower error than fixed scale-selection. It may be observed that even using the fixed scale-selection strategy with MVMS still outperforms the naïve early fusion, which performs no scale selection. Thus obtaining features that have consistent scales across views is an important step when fusing the multi-view feature maps.

Advantageously, the end-to-end trainable DNN-based multiview crowd counting system, which fuses information from multiple camera views to obtain a scene level density map, may be used to effectively and accurately count a number of objects in a large area.

The DNN-based multi-view counting framework fuses camera-views to predict scene-level ground-plane density maps. It is shown that both late fusion of density maps and early fusion of feature maps may be used for obtaining the fusion data. For late fusion, a projection normalization method is proposed to counter the effects of stretching caused by the projection operation. For early fusion, a multi-scale approach is used that selects features that have consistent scales across views. In addition, the network may be trained and tested on each dataset individually.

Although not required, the embodiments described with reference to the Figures can be implemented as an application programming interface (API) or as a series of libraries for use by a developer or can be included within another software application, such as a terminal or personal computer operating system or a portable computing device operating system. Generally, as program modules include routines, programs, objects, components and data files assisting in the performance of particular functions, the skilled person will understand that the functionality of the software application may be distributed across a number of routines, objects or components to achieve the same functionality desired herein.

It will also be appreciated that where the methods and systems of the present invention are either wholly implemented by computing system or partly implemented by computing systems then any appropriate computing system architecture may be utilised. This will include standalone computers, network computers and dedicated hardware devices. Where the terms "computing system" and "computing device" are used, these terms are intended to cover

TABLE 4

| | Dataset | | | | | | | | | | | | |
|---|---|---|---|---|---|---|---|---|---|---|---|---|---|
| | PETS2009 [9] | | | | DukeMTMC [33] | | | | | City Street | | | |
| | Camera | | | | | | | | | | | | |
| | 1 | 2 | 3 | scene | 2 | 3 | 5 | 8 | scene | 1 | 3 | 4 | scene |
| Late fusion (with) | 2.62 | 3.17 | 3.97 | 3.92 | 0.49 | 0.77 | 0.39 | 1.15 | 1.27 | 8.14 | 7.72 | 8.08 | 8.12 |
| Late fusion (without) | 2.75 | 3.86 | 4.37 | 4.22 | 0.63 | 0.73 | 0.51 | 1.31 | 1.43 | 9.89 | 9.60 | 9.82 | 9.87 |
| MVMS (fixed) | 1.74 | 2.57 | 3.81 | 3.82 | 0.65 | 0.46 | 0.88 | 1.44 | 1.09 | 8.11 | 7.83 | 8.32 | 7.80 |
| MVMS (learnable) | 1.66 | 2.58 | 3.46 | 3.49 | 0.63 | 0.52 | 0.94 | 1.36 | 1.03 | 7.99 | 7.63 | 7.91 | 8.01 | any appropriate arrangement of computer hardware capable of implementing the function described.

It will be appreciated by persons skilled in the art that the term "database" may include any form of organized or unorganized data storage devices implemented in either software, hardware or a combination of both which are able to implement the function described.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. A method of counting objects, comprising the steps of:
    obtaining a plurality of images representing the objects to be counted in a target area by a plurality of cameras each arranged to capture a scene representing at least a portion of the target area;
    generating a map for each of the plurality of images representing an identification of each of the corresponding object based on identifying at least one feature of the object including a head of the object, and based on head annotations on an average-height plane at a predetermined height level in a three-dimensional space; and
    fusing the plurality of maps being generated to obtain a scene-level density map representing a count of the objects in the target area.

2. The method of counting objects in accordance with claim 1, wherein the step of generating the map for each of the plurality of images further comprises the step of generating a three-dimensional ground-plane representation representing the identification of the objects in a two-dimensional image space covered by each of the plurality of images.

3. The method of counting objects in accordance with claim 2, wherein the step of generating the map for each of the plurality of images comprises the step of generating a plurality of view-level density maps representing a count of the objects in each of the scenes representing respective portions of the target area.

4. The method of counting objects in accordance claim 3, wherein a plurality of three-dimensional ground-plane representations are generated based on each of the plurality of view-level density maps generated.

5. The method of counting objects in accordance claim 4, wherein the step of fusing the plurality of maps comprises the step of concatenating the plurality three-dimensional ground-plane representations to obtain the scene-level density map.

6. The method of counting objects in accordance with claim 4, further comprising the step of normalizing the plurality three-dimensional ground-plane representations.

7. The method of counting objects in accordance with calim 6, wherein the normalization is based on a normalization weight at each of the ground-plane position (x, y):

$$w_{xy} = \frac{\sum_{ij} D_{x_0,y_0}(i, j)}{\sum_{mn} \mathcal{P}(D_{x_0,y_0}(m, n))}$$

wherein:
    $D_{x_0,y_0}$ denotes an image-space density map containing only one Gaussian kernel centred at $(x_0, Y_0)$;
    P is a projection operation from image space to ground plane; and
    (i, j) and (m, n) are respectively image coordinates and ground plane coordinates.

8. The method of counting objects in accordance with claim 2, wherein the step of generating the map for each of the plurality of images comprises the step of generating a plurality of feature maps representing the identified features in each of the scenes representing respective portions of the target area.

9. The method of counting objects in accordance with claim 8, wherein the plurality of feature maps are generated based on an extraction of features from each of the plurality of images.

10. The method of counting objects in accordance with claim 8, wherein a plurality of three-dimensional ground-plane representations are generated based on each of the plurality of feature maps generated.

11. The method of counting objects in accordance with claim 10, wherein the step of fusing the plurality of maps comprises the step of concatenating the plurality three-dimensional ground-plane representations to obtain the scene-level density map.

12. The method of counting objects in accordance with claim 9, wherein the plurality of images include at least one of the following differences: view angles, scene coverage and scale variations.

13. The method of counting objects in accordance with claim 12, further comprising the step of scaling the features in each of the plurality of images to a predetermined size and extracting a plurality of scale-consistent features to generate the plurality of feature maps.

14. The method of counting objects in accordance with claim 13, wherein the step of scaling the features in each of the plurality of images includes upsampling a set of feature maps extracted from an image pyramid to the same size based on a fixed scale selection process.

15. The method of counting objects in accordance with claim 13, wherein the step of scaling the features in each of the plurality of images includes upsampling a set of feature maps extracted from an image pyramid to the same size based on an adaptive scale selection process.

16. The method of counting objects in accordance with claim 1, wherein the identification of the objects is further based on a machine-learning process.

17. The method of counting objects in accordance with claim 16, wherein the identification of the objects is processed by an end-to-end deep neural network.

18. The method of counting objects in accordance with claim 17, wherein the plurality of maps are generated based on processing the plurality of images using a fully-convolutional network.

19. A system for counting objects, comprising:
    a plurality of cameras arranged to obtain a plurality of images representing the objects to be counted in a target area and to capture a scene representing at least a portion of the target area;
    a mapping module arranged to generate a map for each of the plurality of images representing an identification of each of the corresponding object based on identifying at least one feature of the object including a head of the object, and based on head annotations on an average-height plane at a predetermined height level in a three-dimensional space; and a fusion module arranged to fuse the plurality of maps being generated to obtain a scene-level density map representing a count of the objects in the target area.

20. The system for counting objects in accordance with claim 19, wherein the mapping module is arranged to generate a three-dimensional ground-plane representation representing the identification of the objects in a two-dimensional image space covered by each of the plurality of images.

21. The system for counting objects in accordance with claim 20, wherein the mapping module is further arranged to generate a plurality of view-level density maps representing a count of the objects in each of the scenes representing respective portions of the target area.

22. The system for counting objects in accordance with claim 20, wherein the mapping module is further arranged to generate a plurality of feature maps representing the identified features in each of the scenes representing respective portions of the target area.

23. The system for counting objects in accordance with claim 22, wherein the plurality of feature maps are generated based on an extraction of features from each of the plurality of images.

24. The system for counting objects in accordance with claim 23, wherein the plurality of images include at least one of the following differences: view angles, scene coverage and scale variations.

25. The system for counting objects in accordance with claim 24, wherein the mapping module is further arranged to scale the features in each of the plurality of images to a predetermined size and extracting a plurality of scale-consistent features to generate the plurality of feature maps.

26. The system for counting objects in accordance with claim 19, wherein the mapping module is arranged to identify the objects based on a machine-learning process.

27. The system for counting objects in accordance with claim 26, wherein the mapping module includes an end-to-end deep neural network processor.

* * * * *